United States Patent [19]

Funaki

[11] Patent Number: 5,171,834
[45] Date of Patent: Dec. 15, 1992

[54] SOLVENT TREATMENT OF SYNDIOTACTIC STYRENE-BASED POLYMER MOLDINGS

[75] Inventor: Keisuke Funaki, Ichihara, Japan

[73] Assignee: Idemitsu Kosan Co., Ltd., Tokyo, Japan

[21] Appl. No.: 390,299

[22] Filed: Aug. 7, 1989

[30] Foreign Application Priority Data

Aug. 31, 1988 [JP] Japan ............................. 63-215094

[51] Int. Cl.$^5$ .............................................. C08J 7/02
[52] U.S. Cl. .................................. 528/493; 528/491; 528/497; 528/498; 264/233; 264/341
[58] Field of Search ................ 264/233, 341; 528/491, 528/493, 497, 498

[56] References Cited

U.S. PATENT DOCUMENTS

| | | | |
|---|---|---|---|
| 2,142,968 | 1/1939 | Stoesser | 264/341 |
| 3,476,841 | 11/1969 | Bienert | 264/341 |

FOREIGN PATENT DOCUMENTS

| | | | |
|---|---|---|---|
| 0670124 | 9/1963 | Canada | 526/346 |
| 0210615 | 2/1987 | European Pat. Off. | 526/346 |
| 0342234 | 11/1989 | European Pat. Off. | 526/347.2 |
| 1944931 | 1/1971 | Fed. Rep. of Germany | 264/341 |
| 3077905 | 4/1988 | Japan | 526/347.2 |

OTHER PUBLICATIONS

Williams et al., "Crystallizable Polystyrene...", *JACS*, 79, 1716 (1957).
Rebenfeld et al., "Interactions Between Solvents and Polymers in the Solid State", *J. Macromol. Sci.-Rev. Macromol. Chem.*, C15(2), 279-393 (1976).

*Primary Examiner*—Fred Teskin
*Attorney, Agent, or Firm*—Frishauf, Holtz, Goodman & Woodward

[57] ABSTRACT

Styrene-based polymer moldings and a process for efficient production thereof are disclosed. The styrene-based polymer moldings are obtained by subjecting moldings of styrene-based polymers with mainly syndiotactic configuration and a weight average molecular weight of at least 100,000 to solvent treatment, such as, by dipping in a solvent or exposing to a solvent vapor. The styrene-based moldings are excellent in gas permeability and heat resistance, and thus are useful as gas permeable membranes, vegetable wrapping films or moldings required to have good heat resistance.

8 Claims, No Drawings

SOLVENT TREATMENT OF SYNDIOTACTIC STYRENE-BASED POLYMER MOLDINGS

BACKGROUND OF THE INVENTION

1. Filed of the Invention

The present invention relates to styrene-based polymer moldings and a process for production thereof. More particularly, it is concerned with moldings of styrene-based polymers having mainly a syndiotactic configuration, and having a high crystallinity and excellent heat resistance and gas permeability, and a process for efficiently producing the styrene-based polymer moldings.

2. Description of the Related Arts

Gas permeable films of atactic polystyrene, etc., and polyimide moldings for electric parts having heat resistance (particularly soldering resistance) have heretofore been known. These films or moldings, however, are unsatisfactory for practical use, because they fail to fully meet properties to be required, or they are expensive.

The present inventors' group has succeeded in developing styrene-based polymers of high syndiotacticity (Japanese Patent Application Laid-Open No. 104818/1987). These syndiotactic styrene-based polymers are crystalline polymers and are superior in mechanical strength, heat resistance, chemical resistance and so on to atactic styrene-based polymers and, therefore. are expected to find a variety of applications.

The present inventors' group has proposed stretched films. sheets, yarns, strings, nonwoven fabrics and three dimensional moldings of the above styrene-based polymers having a syndiotactic configuration (Japanese Patent Application Laid-Open Nos. 77905/1988, 259809/1987, 81138/1988, and 98431/1988, and Japanese Patent Application Nos. 3847/1988, 4922/1988, and 161018/1988). Furthermore, it has proposed heat treatment of moldings (Japanese Patent Application No. 3846/1988) and electron ray treatment of moldings (Japanese Patent Application No. 182825/1988) for the purpose of further increasing their heat resistance.

However, in heat treatment, particularly in a case where stretched films are fixed, or stretched fibers are produced, it is difficult to control temperatures at high temperatures, especially in the vicinity of the melting point. In some cases, the films or fibers are partially heated to more than the melting point and there is a danger of break down. Similarly, electron ray treatment has disadvantages of needing an apparatus for irradiation with electron rays and thus increasing production costs, although it is confirmed effective to increase heat resistance.

Stretched atactic polystyrene films conventionally used, when used particularly as vegetable wrapping films, are not sufficiently high in oxygen permeability. Thus a wrapping material having good permeability has been desired. The styrene-based polymers having a syndiotactic configuration as developed by the present inventors' group are unsatisfactory in gas permeability.

SUMMARY OF THE INVENTION

An object of the present invention is to provide moldings of styrene-based polymers having a syndiotactic configuration.

Another object of the present invention is to provide syndiotactic styrene-based polymer moldings having improved heat resistance.

Another object of the present invention is to provide syndiotactic styrene-based polymer moldings having excellent gas permeability.

As a result of investigations to increase crystallinity by efficiently performing crystallization of styrene-based polymers having a syndiotactic configuration, thereby increasing their heat resistance, it has been found that the objects can be attained by treating syndiotactic styrene-based polymer moldings with a solvent.

The present invention provides styrene-based polymer moldings obtained by treating moldings of styrene-based polymers having mainly a syndiotactic configuration and a weight average molecular weight of at least 100,000, with a solvent.

The present invention also provides a process for producing styrene-based polymer moldings which comprises treating moldings of the above styrene-based polymers with a solvent.

DESCRIPTION OF PREFERRED EMBODIMENTS

Styrene-based polymers for use in production of the moldings of the present invention have mainly a syndiotactic configuration.

Styrene-based polymers having mainly a syndiotactic configuration to be used in the present invention refer to polymers with mainly such a stereostructure that phenyl groups or substituted phenyl groups as side chains are located alternately at opposite positions relative to the main chain composed of carbon-carbon bonds. The tacticity is quantitatively determined by a nuclear magnetic resonance using a carbon isotope ($^{13}$C-NMR) method. The tacticity as determined by the $^{13}$C-NMR method is indicated in terms of proportions of structural units continuously connected to each other, i.e., a racemic diad in which two structural units are connected to each other, a racemic triad in which three structural units are connected to each other, and a racemic pentad in which five structural units are connected to each other.

The styrene-based polymers having mainly a syndiotactic configuration of the present invention have such a syndiotactic configuration that the proportion in the racemic diad is at least 75%, preferably at least 85%, or the proportion in the recemic pentad is at least 30%, preferably at least 50%. The styrene-based polymers having mainly a syndiotactic configuration of the present invention include polystyrene, poly(alkylstyrene), poly(halogenated styrene), poly(alkoxystyrene), polyvinyl benzoate and their mixtures, and copolymers containing them as main components.

The poly(alkylstyrene) includes polymethylstyrene, polyethylstyrene, polyisopropylstyrene, and poly(tert-butylstyrene). The poly(halogenated styrene) includes polychlorostyrene, polybromostyrene, and polyfluorostyrene. The poly(alkoxystyrene) includes polymethoxystyrene and polyethoxystyrene. Of these polymers, polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene are most preferred.

The weight average molecular weight of the styrene-based polymer to be used in the present invention is at least 100,000 and preferably at least 150,000. If a molding of a styrene-based polymer having a weight average molecular weight of less than 100,000 is treated with a solvent, the molding is decreased in strength and becomes unsuitable for practical use. That is, in the case of a molding of a styrene-based polymer having a low weight average molecular weight, the molding becomes brittle in crystallization at the time of solvent treatment, thereby losing its self supporting properties and collapsing, or the surface of the molding is seriously damanged.

The molecular weight distribution is not critical and may be narrow or broad.

The styrene-based polymers having mainly a syndiotactic configuration have a melting point of 160° to 310° C. and thus are much superior in heat resistance to the conventional styrene-based polymers having an atactic configuration.

The styrene-based polymers having mainly a syndiotactic configuration can be produced by polymerizing styrene-based monomers (corresponding to the above styrene-based polymers) by the use of a catalyst comprising a titanium compound and a condensate of water and trialkylaluminum in, for example, an inert hydrocarbon solvent or in the absence of a solvent.

The moldings of the present invention are obtained by molding the above styrene-based polymers having mainly a syndiotactic configuration, if necessary, with commonly used additives such as a thermoplastic resin, rubber, an inorganic filler, an antioxidant, a nucleating agent, a plasticizer, a compatibilizer, a colorant, or an antistatic agent, compounded thereto.

Thermoplastic resins which can be used include styrene-based polymers such as atactic polystyrene, isotactic polystyrene, an AS resin, and an ABS resin, polyesters such as polyethylene terephthalate; polycarbonates; polyethers such as polyphenylene oxide, polysulfone, and polyethersulfone; condensation polymers such as polyamide, polyphenylene sulfide (PPS) and polyoxymethylene; acryl-based polymers such as polyacrylic acid, polyacrylate and polymethyl methacrylate; polyolefins such as polyethylene, polypropylene, polybutene, poly(4-methyl-pentene-1), and an ethylene-propylene copolymer; and halogenated vinyl polymers such as polyvinyl chloride, polyvinylidene chloride, and polyvinylidene fluoride.

Although various rubbers can be used, rubber-like copolymers containing a styrene-based compound as one component are most suitable. Examples are rubbers obtained by partially or fully hydrogenating the butadiene portion of a styrene-butadiene block copolymer (SEBS), styrene-butadiene copolymer rubber (SBR), methyl acrylate-butadiene-styrene copolymer rubber, acrylonitrile-butadiene-styrene copolymer rubber (ABS rubber), acrylonitrile-alkyl acrylate-butadiene-styrene copolymer rubber (AABS), methyl methacrylate-alkyl acrylate-styrene copolymer rubber (MAS), and methyl methacrylate-alkyl acrylate-butadiene-styrene copolymer rubber (MABS). These rubber-like copolymers containing a styrene-based compound as one component have good dispersibility in the styrene-based polymers having mainly a syndiotactic configuration, because they have the styrene unit and, therefore, can markedly improve physical properties.

Other rubbers which can be used include natural rubber, polybutadiene, polyisoprene, polyisobutylene, neoprene, ethylene-propylene copolymer rubber, polysulfide rubber, thiokol rubber, acrylic rubber, urethane rubber, silicone rubber, epichlorohydrin rubber, polyether ester rubber, and polyester ester rubber.

The inorganic filler is not critical in shape and may be fibrous, or granular or powdery. Examples of the fibrous inorganic filler are glass fibers, carbon fibers, and alumina fibers. Examples of the granular or powdery inorganic filler are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

Although various antioxidants can be used, phosphorus-based antioxidants such as monophosphites, e.g., tris(2,4-ditert-butylphenyl) phosphite and tris(mono or dip-nonylphenyl) phosphite, and diphosphites, and phenol-based antioxidants are preferably used.

The antioxidant is compounded in an amount of 0.0001 to 2 parts by weight, preferably 0.001 to 1 part by weight per 100 parts by weight of the styrene-based polymer with syndiotactic configuration. If the amount of the antioxidant compounded is less than 0.0001 part by weight, the molecular weight of the polymer is markedly decreased. On the other hand, if it is more than 2 parts by weight, mechanical strength is adversely influenced.

The shape of a molding before solvent treatment, a molding method, a crystallinity and so on are not critical and can be determined appropriately depending on characteristics required for the desired molding. For example, the shape may be a film-like, sheet-like, or a fiber-like. As for the molding method, extrusion molding, inflation molding, spinning, or stretching molding can be applied depending on the molding shape and so on. In connection with the crystallinity, the molding may be crystalline or amorphous. Moldings subjected to heat treatment after molding can be used, if necessary.

In the present invention, in addition to stretched films which are crystallized by stretching or stretched films which are increased in crystallinity by heat treatment, fibers obtained by blow molding or melt spinning, non-woven fabrics, sheets obtained by extrusion molding using a T die, and so on are preferably used.

The above stretched films are obtained, for example, by the method described in Japanese Patent Application No. 3847/1988, more specifically by melting styrene-based polymers having mainly syndiotactic configuration at a temperature exceeding the melting point and then quenching to produce low crystallinity sheets and, thereafter, stretching the low crystallinity sheets at a temperature of between the glass transition temperature and the melting point. These streched films can be further increased in crystallinity by heating at a temperature of between the glass transition temperature and the melting point.

In the present invention, the above molding are treated with a solvent. This solvent treatment includes a solvent dipping treatment and a solvent vapor treatment. These methods can be applied in combination.

Solvents which can be used in the solvent dipping treatment include aromatic solvents such as benzene, toluene, xylene, 1,2,4-trichlorobenzene and benzaldehyde, aliphatic hydrocarbon solvents such as hexane, heptane, Decalin ® (decahydronaphthalene) and cyclohexane, and commonly used polar solvents such as acetone, methyl ethyl ketone, ethyl acetate, carbon tetrachloride, chloroform, trichloroethylene, methylene chloride, tetrachloroethylene and trichloroethane.

In connection with conditions for the solvent dipping treatment, optimum conditions vary with the type of the solvent used. The temperature of the solvent should be preferably set within the range between room temperature and a temperature 20° C. lower than the boiling point of the solvent. If the temperature of the solvent is too low, moisture in air condenses and it takes a long time to dry the moldings. On the other hand, if the temperature of the solvent is too high, the molding is partially dissolved particularly in the case of aromatic solvents. The dipping time is determined appropriately depending on crystallinity, properties and so on of the objective molding. Usually the dipping time is sufficient to be not more than 5 minutes. Even if dipping is carried out for a longer time, no additional effect can be obtained and rather the efficiency is decreased.

The molding is treated by dipping in a solvent as described above. After this dipping, the molding can be again dipped in another solvent. On drying the molding after the treatment, a molding having the desired performance can be obtained.

The solvent vapor treatment can be applied in place of the above solvent dipping treatment or in combination therewith. In the vapor solvent treatment, the same solvents as used in the solvent dipping treatment can be used. In particular, volatile solvents having a low boiling point are preferred because they readily generate vapor. A method of generating solvent vapor is not crtical in the present invention. For example, a method in which sheet production or spinning is carried out in one continuous unit and the molded sheet, string or film is continuously passed through between a heated solvent solution and a vapor suction apparatus, or a method in which a heated solvent is sprayed through a fine nozzle to the molded sheet, string or film passing through a heated oven, can be employed.

Conditions for the solvent vapor treatment vary with the type of the solvent. The vapor pressure is preferably within the range of 200 to 760 mmHg. If the vapor pressure is less than 200 mmHg, the crystallization efficiency is sometimes decreased. On the other hand, if it is more than 760 mmHg, a pressurizing apparatus is undesirably required. The treating time may be longer than in the solvent dipping treatment and usually it is sufficient to be not more than 20 minutes.

The moldings of the present invention are excellent in gas permeability and heat resistance. The solvent treatment permits to attain a higher crystallinity, thereby providing moldings having a high modulus of elasticity.

The present invention permits production of styrene-based polymer moldings excellent in physical properties such as gas permeability and heat resistance. Moreover such excellent styrene-based polymer moldings can be obtained by a markedly short time solvent treatment and thus the production efficiency is greatly increased.

The styrene-based polymer moldings can be effectively used as gas permeable membranes, vegetable wrapping films or various moldings required to have high heat resistance, for example.

The present invention is described in greater detail with reference to the following examples.

PREPARATION EXAMPLE 1

(Production of Styrene-Based Polymer having mainly Syndiotatic Configuration)

Two L (L=liter) of toluene as a solvent, and 1 mmol of cyclopentadienyltitanium trichloride and 0.6 mol as a aluminum atom of methylaluminoxane as catalyst components were placed in a reactor, and 3.6 L of styrene was added thereto and polymerized for one hour at 20° C.

After completion of the reaction, the reaction product was washed with a mixture of hydrochloric acid and methanol to decompose and remove the catalyst components, and then dried to obtain 330 g of a polymer.

This polymer (polystyrene) was subjected to Soxhlet extraction using methyl ethyl ketone as a solvent to obtain an extraction residue of 95% by weight. This polymer (the extraction residue) had a weight average molecular weight of 290,000, a number average molecular weight of 1,580,000, and a melting point of 270° C. In a nuclear magnetic resonance analysis using carbon isotope ($^{13}$C-NMR analysis)(solvent: 1,2-dichlorobenzene), an absorption peak at 145.35 ppm resulting from syndiotactic configuration was observed. The syndiotacticity in terms of racemic pentad as calculated from the peak area was 96%.

EXAMPLE 1

A hundred parts by weight of polystyrene powder having syndiotactic configuration as obtained in Preparation Example 1, 0.7 part weight of bis(2,4-di-tert-butylphenyl) pentaerythritol diphosphite and 0.1 part by weight of 2,6-ditert-butyl-4-methylphenol as antioxidants were dry blended. The resulting powder was melted at 296° C. and quenched to obtain a low crystallinity compressed sheet.

This low crystallinity sheet was subjected to 3.5×3.5 time biaxial stretching at 120° C. to obtain a film having a thickness of 25 μm. This film was fixed with a lattice-shaped fixing apparatus, and placed above chloroform heated to 50° C. and exposed to chloroform vapor for 5 minutes. This film was vacuum dried while fixing to obtain the desired film. No cleavage occurred in the film.

The thermal distortion temperature of the film was measured with a thermal mechanical analysis (TMA) as a temperature at which 2% distortion occurred. This film was measured for oxygen permeation coefficient by the differential method. The results are shown in Table 1.

EXAMPLE 2

A film was obtained in the same manner as in Example 1 except that the stretched film was dipped for 5 seconds in chloroform maintained at 40° C. in place of exposing to chloroform vapor. The results are shown in Table 1.

EXAMPLE 3

A film was obtained in the same manner as in Example 2 except that toluene maintained at 80° C. was used in place of the chloroform. The results are shown in Table 1.

EXAMPLE 4

A film was obtained in the same manner as in Example 3 except that the stretched film was fixed with a lattice and was subjected to heat treatment at 250° C. for 20 seconds prior to its solvent treatment. The results are shown in Table 1.

EXAMPLE 5

Syndiotactic polystyrene and an antioxidant were dry blended in the same manner as in Example 1, melted at 310° C., extruded through a T die and quenched to obtain transparent film having a thickness of 100 μm. This film was fixed with a lattice and then dipped for 10 seconds in toluene maintained at 80° C. to obtain the desired film. At this time, the film was whitened. The results are shown in Table 1.

EXAMPLE 6

Syndiotactic polystyrene and an antioxidant were dry blended in the same manner as in Example 1, melted at 300° C., extruded through a fine nozzle, and quenched to obtain a fibrous molding. This fibrous molding was stretched to 5 times the original size, fixed, and dipped for 5 seconds in xylene maintained at 110° C. to obtain the desired fibrous molding. The results are shown in Table 1.

COMPARATIVE EXAMPLE 1

Upon application of heat treatment at 270° C. for 5 seconds to the stretched film without solvent treatment, as obtained in Example 1, in the condition that was fixed with a lattice, film cleavage occurred.

COMPARATIVE EXAMPLE 2

Upon application of heat treatment at 250° C. to the stretched film without solvent treatment, film cleavage did not occur. The results are shown in Table 1.

COMPARATIVE EXAMPLE 3

Properties of the stretched film without solvent treatment, as obtained in Example 1, were measured. The results are shown in Table 1.

COMPARATIVE EXAMPLE 4

Atactic polystyrene (trade name: Idemitsu Styrol US300; weight average molecular weight: 370,000; melt index: 2 g/10 min; produced by Idemitsu Petrochemical Co., Ltd.) was melted at 200° C. and molded to obtain a press sheet.

This press sheet was simultaneously biaxially stretched to 3.5×3.5 time the original size at 120° C. The results are shown in Table 1.

COMPARATIVE EXAMPLE 5

Upon application of heat treatment at 270° C. to the fibrous molding without solvent treatment, as obtained in Example 5, the molding was broken.

PREPARATION EXAMPLE 2

Three L of toluene, and 0.75 mmol of cyclopentadienyltitanium trichloride and 450 mmol as aluminum atom of methylaluminoxane were placed in a 10-liter reactor. Three L of styrene was introduced in the reactor at 30° C. and further hydrogen was introduced until the partial pressure of hydrogen reached 1.0 kg/cm$^2$, and polymerization was carried out for 1.5 hours. After completion of the reaction, the reaction product was with a mixture of hydrochloric acid and methanol to decompose and remove the catalyst components, and then dried to obtain 360 g of a polymer.

This polymer (polystyrene) was subjected to Soxhlet extraction using methyl ethyl ketone as a solvent to obtain an extraction residue of 96% by weight. This polymer (the extraction residue) had a weight average molecular weight of 73,000, a number average molecular weight of 12,000, and a melting point of 267° C.

In a nuclear magnetic resonance using carbon isotope $^{13}$C-NMR) analysis of the polymer, an absorption peak at 145.35 ppm as ascribable to the syndiotactic configuration was observed. The syndiotacticity in terms of racemic pentad as calculated from the peak area was 96%.

COMPARATIVE EXAMPLE 6

The procedure of Example 5 was repeated with the exception that the syndiotactic polystyrene of Preparation Example 2 was used. In this case, after dipping, the film was roughened in its surface and lost its self supporting properties, finally collapsing.

TABLE 1

| | Polymer[*1] | Weight Average Molecular Weight | Shape of Molding | Treating Method | Break-Down or Cleavage due to Treatment |
|---|---|---|---|---|---|
| Example 1 | SPS | 290,000 | Film | Solvent vapor (chloform) | No |
| Example 2 | SPS | 290,000 | Film | Solvent dipping (chloroform) | No |
| Example 3 | SPS | 290,000 | Film | Solvent dipping (toluene) | No |
| Example 4 | SPS | 290,000 | Film | Heat treatment (250° C.), solvent dipping (toluene) | No |
| Example 5 | SPS | 290,000 | Film | Solvent dipping (toluene) | No |
| Example 6 | SPS | 290,000 | Fibrous molding | Solvent dipping (xylene) | No |
| Comparative Example 1 | SPS | 290,000 | Film | Heat treatment (270° C.) | Cleavage |
| Comparative Example 2 | SPS | 290,000 | Film | Heat treatment (250° C.) | No |
| Comparative Example 3 | SPS | 290,000 | Film | None | — |
| Comparative Example 4 | aPS | 370,000 | Film | None | — |
| Comparative Example 5 | SPS | 290,000 | Fibrous molding | Heat treatment (270° C.) | Break-down |
| Comparative Example 6 | SPS | 73,000 | Film | Solvent dipping (toluene) | Collapsed |

| | Thermal Distortion Temperature[*2] (°C.) | Oxygen Permeation Coefficient[*3] (× 10$^{10}$) (cc-cm/cm$^2$-sec-cmHg) | Modulus of Tensile Elasticity (kg/cm$^2$) |
|---|---|---|---|
| Example 1 | 251 | 5.1 | 55,000 |
| Example 2 | 253 | 5.5 | 57,000 |
| Example 3 | 252 | 5.4 | 53,000 |

TABLE 1-continued

|  |  |  |  |
|---|---|---|---|
| Example 4 | 256 | 6.3 | 55,000 |
| Example 5 | 250 | 4.9 | 49,000 |
| Example 6 | 254 | — | 120,000 |
| Comparative Example 1 | — | — | — |
| Comparative Example 2 | 242 | 4.0 | 41,000 |
| Comparative Example 3 | 90 | 2.1 | 40,000 |
| Comparative Example 4 | 90 | 1.0 | 37,000 |
| Comparative Example 5 | — | — | — |
| Comparative Example 6 | — | — | — |

[1] SPS: Syndiotactic polystyrene, aPS: atactic polystyrene
[2] 2% distortion temperature as determined by the thermal mechanical analysis (TMA).
[3] Measured according to ASTM D-1434-75M.

What is claimed is:

1. A process for producing a syndiotactic styrene polymer molding having improved physical properties, said styrene polymer having a syndiotacticity of at least 50% in terms of the racemic pentad and a weight average molecular weight of at least 150,000, which comprises contacting the surface of said molding with a solvent to improve the physical properties of said molding and wherein said molding is a stretched molding;

said styrene polymer is selected from the group consisting of polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene and said solvent is chloroform, toluene, xylene, benzene, 1,2,4-trichlorobenzene, benzaldehyde, hexane, heptane, decahydronaphthalene, cyclohexane, acetone, methyl ethyl ketone, ethyl acetate, carbon tetrachloride, trichloroethylene, methylene chloride, tetrachloroethylene or trichloroethane.

2. The process as claimed in claim 1, wherein said styrene polymer is polystyrene.

3. The process as claimed in claim 1, wherein the molding surface is contacted with said solvent by dipping in said solvent.

4. The process as claimed in claim 1, wherein the molding surface is contacted with said solvent by contact with the vapor of said solvent.

5. The process as claimed in claim 1, wherein the polymer has a melting point of 160° C. to 310° C.

6. The process as claimed in claim 1, wherein the syndiotactic styrene polymer molding is heated prior to being contacted with said solvent.

7. The process as claimed in claim 1, wherein said solvent is chloroform, toluene, xylene, cyclohexane, acetone, methyl ethyl ketone, or trichloroethane.

8. The process as claimed in claim 1, wherein said solvent is chloroform, toluene, or xylene.

* * * * *